United States Patent [19]
Cronin et al.

[11] 3,770,340
[45] Nov. 6, 1973

[54] COHERENT OPTICAL SYSTEM WITH EXPANDED BANDWIDTH AND NOISE SUPPRESSION

[75] Inventors: David J. Cronin, Sudbury; Alward I. Pinard, Watertown, both of Mass.; Albert E. Smith, Riverside, Calif.

[73] Assignee: Technical Operations, Incorporated, Burlington, Mass.

[22] Filed: Aug. 21, 1972

[21] Appl. No.: 282,395

[52] U.S. Cl. .......................................... 350/162 SF
[51] Int. Cl. ............................................... G02b 5/18
[58] Field of Search ............................... 350/162 SF

[56] References Cited
UNITED STATES PATENTS
3,648,039   3/1972   Kowalski........................ 350/162 X OTHER PUBLICATIONS
"Removal of the Zero Order in Optical Fourier Transformers" by E. B. Felstead from Applied Optics, Vol. 10, No. 5, May, 1971, Pages 1185–1187.

*Primary Examiner*—William F. Lindquist
*Attorney*—Alfred H. Rosen et al.

[57] ABSTRACT

A coherent optical system is shown having the principal optical components arrayed on an axis, with a coherent light source effectively located off axis and arranged for effective rotation in a circular locus concentric with the axis. The dc term of the Fourier transform of an object that modulates light from the source is located off-axis in the Fourier transform plane and rotates about the axis so that an aperture stop in the transform plane which would pass the $n$-th order diffraction pattern where the dc term located on axis now passes the $2n$-th order diffraction pattern thereby doubling the spatial frequency bandwidth of such coherent systems and enhancing resolution. At the same time, optical noise is reduced by averaging over the field.

17 Claims, 6 Drawing Figures

3,770,340

COHERENT OPTICAL SYSTEM WITH EXPANDED BANDWIDTH AND NOISE SUPPRESSION

BACKGROUND OF THE INVENTION

Coherent optical systems are characterized by optical noise due in part to edge ringing in images made by coherent light. Spatial frequency bandwidth of coherent optical systems is limited by the effective aperture stop in the Fourier transform plane, since obviously the effective aperture is not infinite and diffraction orders beyond an $n$-th (arbitrary) order will be blocked. Incoherent systeme are possible having higher bandwidth and less noise than coherent systems using the same imaging optics, but these are subject to decrease in contrast at high spatial frequencies. It is recognized by workers in the art that noise suppression is a continuing need in all coherent optical systems.

BRIEF DESCRIPTION OF THE INVENTION

In the present invention methods and apparatus are provided for producing optical images with coherent illumination, which have the following properties:

1. the spatial frequency bandwidth is twice the normal coherent bandwidth of the lenses used; the bandwidth is the same as that for an equivalent incoherent system;
2. the modulation transfer function (MTF) has a unique shape which does not generate the edge-ringing that is characteristic of other coherent systems, or the decrease in contrast at high spatial frequencies that is characteristic of incoherent systems; and
3. the noise which is characteristic of coherent systems generally is suppressed by averaging over the field; suppression of noise below the threshold of detectors commonly used is possible.

The invention employs a dynamic coherent system, in which an effectively off-axis light source is rotated in a locus encircling the optic axis of the system, and the dc term of the object Fourier transform is correspondingly rotated about the axis in the transform plane entrance pupil. With the dc term thus off-set, preferably to the edge of the entrance pupil, the spatial frequency bandwidth of the system is effectively doubled. Where the spatial frequency band-limit is $\nu_o$ for the equivalent incoherent system, a normal coherent system (with dc term on axis) will bandstop at $\nu_o/2$. By setting the dc term off-axis in this manner, spatial frequencies up to $2\nu_o/2 = \nu_o$ are passed, and rotation of the dc term about the axis increases the amount of light passed in the higher frequencies. The dc term is strongest because it is always present. The noise level of the dynamic-coherent system is no greater and in signal-to-noise ratio it is better than the equivalent coherent system. The transfer function (MTF) of the dynamic-coherent system with its increased band-width and greater response at high spatial frequencies taken together with the resulting noise suppression gives excellent reproduction with an enhancement of the high spatial frequencies and without edge-ringing common to coherent images.

DETAILED DESCRIPTION OF THE DRAWINGS

Figure 1:
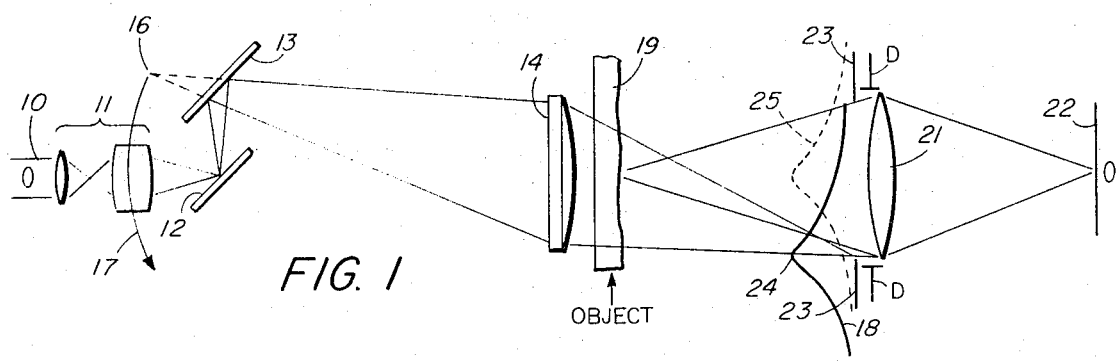
FIG. 1 is a schematic view of a dynamic-coherent optical system according to the invention.
Figure 2:
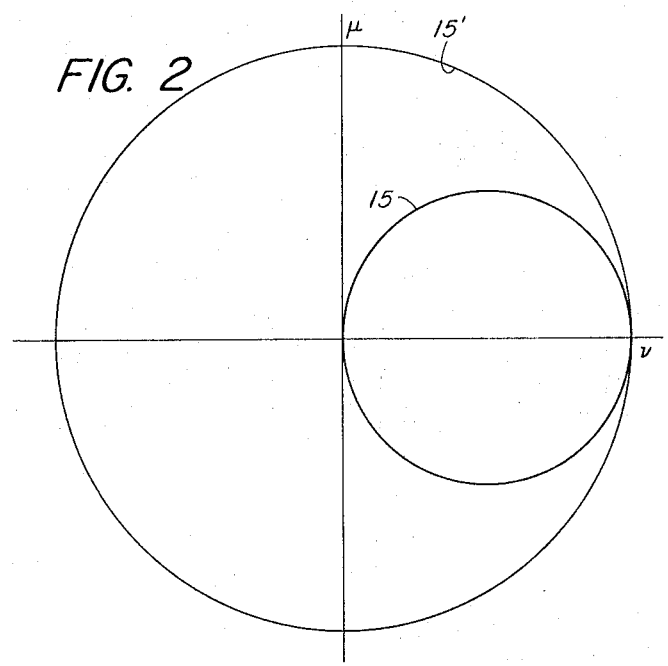
FIG. 2 is a diagram showing the dc term of the Fourier transform of the object in FIG. 1 as located in the pupil of the aperture stop in the transform plane.

FIG. 1 shows the principal components of a dynamic-coherent optical system according to the invention. The system is arrayed along an optic axis 0—0. A source of coherent light in the form of a laser beam 10 on the axis 0—0 is brought to a focus by a lens system 11 on a mirror 12 oriented at 45° to the axis. A second mirror 13 parallel to but spaced transversely to the axis from the first mirror reflects the diverging laser beam to a relay lens 14 which brings to a focus in the entrance pupil 15 having a diameter D in the Fourier transform plane of the system an image of the virtual point source 16 appearing to emanate from behind the second mirror 13. By means of any suitable rotating apparatus (such being well-known and hence not illustrated) the mirror pair 12–13 is rotated about the axis 0—0 to rotate or deviate the virtual source 16 in a circular locus represented by a curved arrow 17. It will be understood that the mirrors 12, 13 may be surfaces of totally-internally-reflecting prisms in a unitary structure. It will be further understood that any alternate system, for example one using a rotating light source instead of the virtual rotation produced by the mirror system 12, 13, can also be used. An object 19 of which the Fourier transform 18 is to be erected in the entrance pupil 15 is located following the relay lens 14 at one conjugate focus of an imaging lens 21 which erects a retransformed image in an image plane 22 located at the second conjugate focus of the imaging lens. The mirror system 12, 13 deviates the beam (i.e: virtual source 16) so that the Fourier transform 18 of the object 19 falls with its central image or dc term 24 close to the edge of the entrance pupil 15 in the transform plane. As the mirrors rotate about the optic axis 0—0, deviating the source 16 through the locus 17, the dc term 24 rotates in a locus that coincides with the pierphery of the entrance pupil 15. The dotted-line curve 25 shows the location that the Fourier transform 18 would take, an axis, if the source 16 were also on-axis. The image viewed at the image plane 22 in one rotation is the time-average of the spatial frequency components present in the entrance pupil 15. Since the dc term is present at all times, it is the strongest term. As the spatial frequencies in the Fourier transform plane rotate in the entrance pupil 15, the effective pupil in the transform plane becomes the larger circle 15' (shown in FIG. 2), which defines the spatial frequency band-pass of the system. The time that any particular spatial frequency is in the entrance pupil 15 relative to the dc term 24 thus gives the value of the modulation transfer function (MTF) at that frequency.

Figure 3:
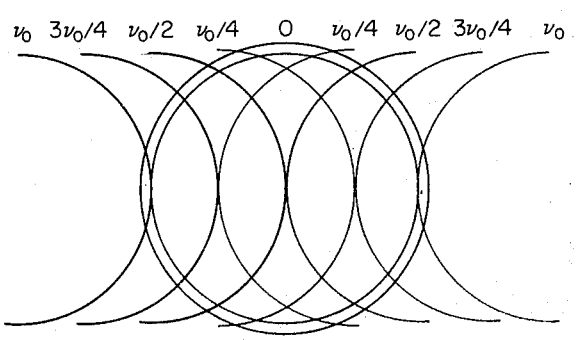
FIG. 3 illustrates the effective spatial frequency bandwidth of the system of FIG. 1.

FIG. 3 shows the trajectories of several spatial frequencies as they pass through the entrance pupil 15, for the offset which places the dc term (zero frequency) 24 at the pupil edge. It can be seen that the offset brings into the entrance pupil 15 spatial frequencies up to twice those passed by the normal coherent system.

Each point in the Fourier transform (frequency) plane rotates in a circular path with a radius the same as the entrance pupil 15. The arc length in the pupil for each frequency is:

$$S = 4R \arccos(\nu/\nu_o), \quad 0 \leq \nu \leq \nu_o$$

(Relation 1)

where:

$\nu$ is the spatial frequency; and $\nu_o$ is the maximum spatial frequency passed (i.e: the band limit of the equivalent incoherent system) Normalization by division with $2\pi R$ gives the modulation transfer function:

$$MTF = 2/\pi \arccos(\nu/\nu_o), \quad 0 \leq \nu \leq \nu_o$$

(Relation 2)

Figure 4:
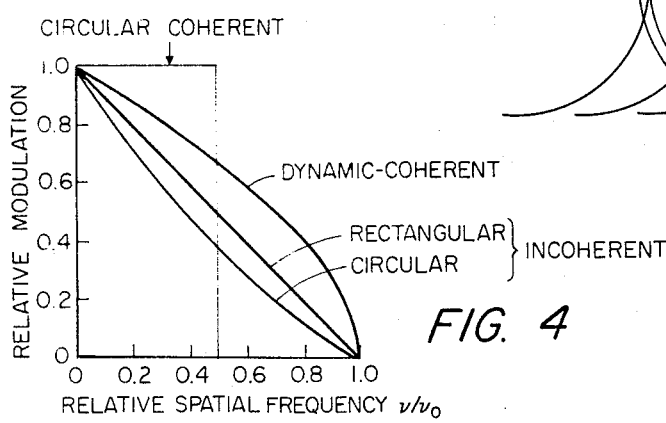
FIG. 4 is a comparative illustration of the modulation transfer function of the dynamic coherent system of FIG. 1 with other coherent and incoherent transfer functions.

In FIG. 4 the tranfer function 30 of the dynamic-coherent system is shown together with several others, for comparison. The coherent and incoherent circular systems have the same parameters as the dynamic-coherent. The rectangular aperture has a side length equal to the diameters of the other apertures, which are all circular.

Unique properties of the invention are:

a. the band-width is twice the normal coherent bandwidth of the lenses used; it is the same as that for an equivalent incoherent system (Relation 2);

b. the transfer function has a unique shape which does not generate the edge-ringing that is characteristic of other coherent systems; nor does it suffer the decrease in contrast at high spatial frequencies that is characteristic of incoherent systems; and c. the noise, which is a persistent characteristic of coherent systems, is suppressed by averaging over the field; suppression may be sufficient with this technique to bring noise down to a level below the threshold of detectors currently in use.

Figure 6:
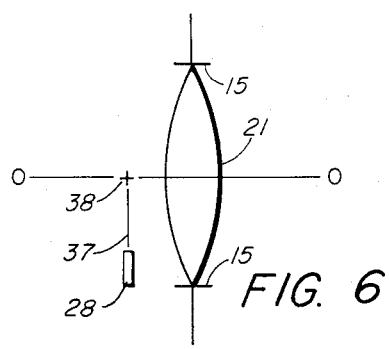
FIG. 6 is a modification of FIG. 1 for spatial filtering.

To incorporate spatial filtering in FIG. 1, it is only necessary to put a spatial filter in the transform plane, centered with respect to the dc term 24 of the Fourier transform 18, and rotate the filter about the axis 0—0 synchronously with the source image 16, so that there is no relative motion between the spatial filter and the Fourier transform 18. FIG. 6 illustrates a spatial filter 28 located to block the dc term 24, mounted for rotation about the axis at 38 at the end of a radially-disposed support 37. This is obviously by way of example only.

To perform dark-field imaging, a stop 23 can be placed over the entrance pupil, sufficient to block the dc term 24. Alternatively, the deviation of the source image 16 may be increased to the degree that the dc term falls outside the entrance pupil 15, or the arrangement shown in FIG. 6 may be used.

Figure 5:
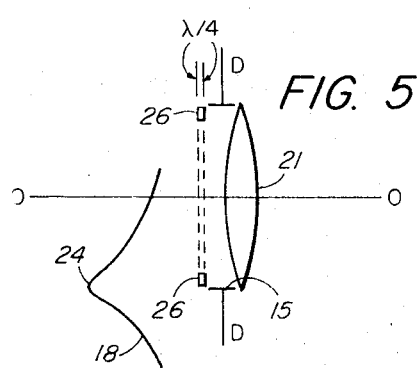
FIG. 5 is a modification of FIG. 1 to a Zernike phase contrast system for viewing phase objects.

To make a Zernike phase contrast instrument (e.g: microscope) out of this system, for viewing phase objects, FIG. 1 can be modified as is illustrated in FIG. 5. A thin annular phase filter 26 is located around the inner edge of the entrance pupil 15. The thickness of this filter is chosen to cause a $\pi/2$ phase shift of the dc term 24 relative to the remainder of the Fourier transform 18. The radial width of the filter is limited to affect essentiaally only the dc term 24.

We claim:

1. Method of operating a coherent optical system having its principal optical components arrayed on a given axis, to minimize noise and increase the spatial frequency bandwidth, comprising the steps of erecting a source of coherent light effectively displaced transversely from said axis, focusing an image of said source in a Fourier transform plane at a locus in said plane displaced transversely from said axis, and effectively rotating said source around said axis on a fixed radius, whereby to rotate said image in said plane on afixed radius.

2. Method according to claim 1 in which the Fourier transform of an object modulating light from said source is formed in said Fourier transform plane, comprising the step of locating the dc term of said Fourier transform substantially entirely to one side of said axis whereby rotation of said source rotates said dc term about said axis.

3. Method according to claim 2 comprising the step of substantially blocking said dc term.

4. Method according to claim 2 comprising the step of phase-shifting said dc term substantially $\pi/2$ relative to the remainder of said Fourier transform.

5. Method according to claim 2 comprising spatially-filtering said Fourier transform with a filter that is fixed relative to said Fourier transform.

6. Method according to claim 1 in which the Fourier transform of an object modulating light from said source is formed in said Fourier transform plane, said plane having a predetermined entrance pupil, said Fourier transform including spatial frequency components of which the $n$-th component would be the highest passed through said entrance pupil if said dc term were centered on said axis, comprising the step of locating said dc term substantially at the edge of said entrance pupil so that during said rotation of said source the $2n$-th component of said spatial frequency components is passed through said entrance pupil.

7. Method according to claim 1 comprising the step of locating a real source of said light on a circular locus at a fixed transverse distance from said axis, and rotating said source in said locus.

8. Method according to claim 1 comprising the steps of locating a real source of said light on said axis, optically effectively displacing light from said source to a region transversely disposed to said axis and thereby erecting a virtual source of said light on a circular locus at a fixed transverse distance from said axis, and rotating said virtual source in said locus.

9. In a coherent optical system for forming in a Fourier transform plane having a predetermined entrance pupil, from coherent illumination, a Fourier transform object located to modulate said illumination, said transform having a dc term and a series of spatial frequency components, the improvement comprising a source of coherent light appearing to be spaced transversely from said axis in a circular locus centered on said axis, the radius of said source being such that said dc term is located in said plane substantially entirely to one side of said axis, and means to rotate said source in said locus whereby to rotate said dc term about said axis.

10. A system according to claim 9 including an aperture member for stopping said tranform plane to an entrance pupil that at least partially blocks said dc term.

11. A system according to claim 9 in which said source is effectively spaced a distance from said axis such that said dc term falls essentially outside said entrance pupil.

12. A system according to claim 9 in which said entrance pupil has a size that would cut off spatial frequencies of said Fourier transform higher than the $n$-th component if said dc term were centered on said axis, said dc term being located substantially at the periphery of said entrance pupil, whereby rotation of said source in said locus will bring the $2n$-th component of a diffracted image into said entrance pupil.

13. A system according to claim 9 having a real source of said coherent light in said locus, and means to rotate said source about said axis in said locus.

14. A system according to claim 9 having a real source of said light on said axis, optical means to deflect light from said source transversely to said axis for erecting a virtual source of said light in said locus, and means including said optical means to rotate said virtual source about said axis in said locus.

15. A system according to claim 9 including means substantially to block said dc term.

16. A system according to claim 9 including means to phase-shift said dc term substantially $\pi/2$ relative to the remainder of said Fourier transform.

17. A system according to claim 9 including a spatial filter in said plane and means to rotate said filter about said axis synchronously with said source whereby to maintain said filter fixed relative to said Fourier transform.

* * * * *

PO-1050
(5/69)

UNITED STATES PATENT OFFICE
CERTIFICATE OF CORRECTION

Patent No. 3,770,340            Dated November 6, 1973

Inventor(s) David J. Cronin, Alward I. Pinard and Albert E. Smith

It is certified that error appears in the above-identified patent and that said Letters Patent are hereby corrected as shown below:

Column 1, line 8, change "systeme" to --systems--

Column 2, line 49, change "an" to --on--

Column 4, line 53, after "transform" insert --of an--

Column 5, line 10, change "a diffracted image" to

--said Fourier transform--

Signed and sealed this 13th day of May 1975.

(SEAL)
Attest:

RUTH C. MASON  
Attesting Officer

C. MARSHALL DANN  
Commissioner of Patents  
and Trademarks